March 13, 1928.

H. M. STOLLER ET AL 1,662,083

ELECTRIC REGULATOR

Filed Aug. 4, 1926

Inventors: Hugh M. Stoller
Edmund R. Morton
by EW Griggs
Attorney

Patented Mar. 13, 1928.

1,662,083

UNITED STATES PATENT OFFICE.

HUGH M. STOLLER, OF MOUNTAIN LAKES, NEW JERSEY, AND EDMUND R. MORTON, OF NEW YORK, N. Y., ASSIGNORS TO WESTERN ELECTRIC COMPANY, INCORPORATED, OF NEW YORK, N. Y., A CORPORATION OF NEW YORK.

ELECTRIC REGULATOR.

Application filed August 4, 1926. Serial No. 127,049.

This invention relates to electric regulators and particularly to systems for regulating the speed or frequency of dynamo electric machines.

An object of the invention is to simplify the operation and maintenance of electric regulators.

Another object of the invention is to increase the precision of regulation of electric regulators.

In accordance with the preferred form of this invention which is hereinafter described in detail, the speed of an alternating current motor is controlled by varying the voltage drop across a reactor in the alternating supply circuit whenever the speed of the motor tends to depart from the normal. An alternating current generator, driven by the armature shaft of the motor, produces a current the frequency of which varies in response to variations in the speed of the motor. A selective circuit in the output of the generator, tuned to a frequency slightly higher than the frequency of the generator when the motor is operated at normal speed, controls the potential impressed upon the grid of a space discharge tube detector in the control circuit. The current in the output of this detector is utilized to control the impedance of the reactor in the motor supply circuit to regulate the speed of the motor.

A feature of the invention is a pair of space discharge tubes operating on both halves of the main alternating current wave supplying the motor, and acting as self-rectifying amplifiers, to increase the regulating current supplied to the reactor.

In accordance with another feature of the invention, a secondary control is exerted on the detector tube in accordance with the rate of change of the motor speed to prevent hunting action, thereby stabilizing the operation of the regulator.

According to another feature of the invention, an auxiliary rectifier is associated with the alternating current supply circuit to supply energy to the detector and amplifier tubes, so that the local regulator circuit requires practically no maintenance.

Figure 1:
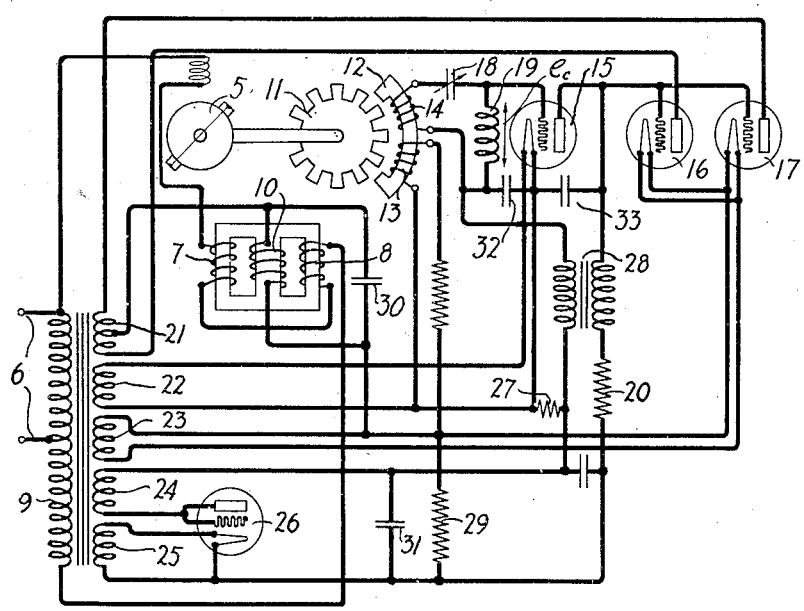
Figure 2:
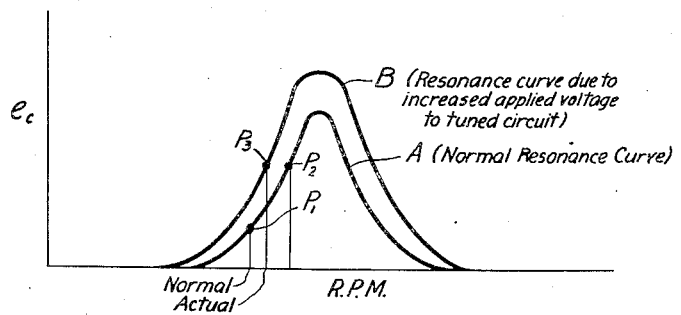

The invention will be described in connection with the accompanying drawing, in which:

Fig. 1 is a diagrammatic illustration of a regulating system embodying the invention; and Fig. 2 shows curves illustrating the relation between the frequency of the generator or speed of the motor and the voltage impressed upon the grid of the detector tube.

In Fig. 1, an alternating current repulsion motor 5 which receives current from the line 6 is shown in connection with a circuit for regulating the speed of the motor. Control of the motor speed is effected by varying the voltage drop across a reactor which is inserted in the motor supply circuit 6. The reactor comprises a three-legged magnetic modulator having alternating current windings 7 and 8 on the outer legs connected in series across the outer terminals of an autotransformer 9 terminating the supply circuit 6, and a direct current control winding 10 on the middle leg for varying the voltage drop across the reactor in a manner hereinafter described.

The regulating system includes an alternating current inductor generator having a toothed rotor 11 driven by the armature shaft of the motor 5. This generator has a field structure 12 on which is mounted a field coil 13 and a generator coil 14. As the teeth of the rotor pass both pieces of the field structure, the reluctance of the magnetic circuit is varied, generating electrical variations of high frequency in the winding 14. In one case, which is cited as a specific example, a current of 2160 C. P. S. frequency at 1200 R. P. M. was produced in the winding 14 with the motor 5 operating at normal speed.

The regulator circuit proper includes a space discharge tube detector 15 and a pair of space discharge tube amplifiers 16 and 17. A tuned circuit comprising a condenser 18 and an inductance 19 is connected to the winding 14 of the alternating current generator, the input circuit of the detector 15 being connected across the inductance 19. The grids of the tubes 16 and 17 are connected together, the input circuit of these tubes being connected across a coupling resistance 20 in the output circuit of the detector 15.

The maintenance of the regulator system is simplified, according to the invention, by eliminating local sources of current and by supplying energy to the detector and amplifier tubes from the alternating current supply circuit 6. Plate voltage is supplied to the amplifier tubes 16 and 17 from the secondary winding 21 of the transformer 9, and filament heating current is supplied to the detector tube 15 and to the amplifier tubes 16 and 17 from similar secondary windings 22 and 23, respectively. An auxiliary rectifier tube 26 is provided to properly polarize the grid of detector tube 15 to supply plate voltage thereto and to furnish excitation to the generator field winding 13. The rectifier tube 26 has its plate and filament coupled to the supply circuit 6 by means of secondary transformer windings 24 and 25, respectively, and furnishes grid biasing potential to the detector tube 15 across the resistance element 27.

The direct current winding 10 of the reactor is connected to a mid-tap of the secondary transformer winding 21 in the output circuit of amplifier tubes 16 and 17. The tubes 16 and 17, connected in the manner shown, operate on both halves of the alternating current wave and act as self-rectifying amplifiers to increase the energy supplied to the winding 10 of the reactor. When the motor 5 is operating at low speed a current below the normal frequency is generated in the alternating current generator coil 14, and consequently the voltage across the inductance 19 of the tuned circuit is below the normal value. The voltage impressed on the grid of the detector tube 15 is therefore low and no current flows through the detector tube or the coupling resistance 20. As a consequence the grids of the amplifier tubes 16 and 17 are at a somewhat higher positive potential than the filaments due to the drop in the resistance 29. The space current flowing in the output circuit of these tubes is therefore large. Since this current passes through the winding 10 on the middle leg of the reactor, the impedance of the reactor is small and motor 5 receives a high voltage. The motor 5 being of a type in which the speed is responsive to variations in applied voltage, is accelerated until a speed is reached at which the current in the generator winding 14 approaches the resonance frequency of the tuned circuit 18—19. At this point the voltage across the inductance 19 increases rapidly, causing an increase in space current through the coupling resistance 20 which drives the grids of the amplifier tubes 16 and 17 negative. This action reduces the space current flowing through the winding 10 of the reactor and hence increases the impedance of the reactor and correspondingly reduces the voltage applied to the motor 5, thus preventing a further increase in the speed of the motor. The condensers 30, 31, 32 and 33 are for the purpose of steadying the current through the apparatus which they shunt.

Fig. 2 illustrates a characteristic curve of the tuned circuit 18—19, in which the ordinates represent the voltage across the inductance 19 and the abscissæ represents the speed in R. P. M. or the output frequency of the alternating current generator. The scale has been so chosen, for convenience in illustration, that the slope appears to be less than is actually the case. The curve A is the normal resonance curve of the tuned circuit. In the curves of Fig. 2 the ordinates represent alternating current voltages applied to the grid of the detector tube and the abscissæ the speed of the generator in R. P. M. or its output frequency. Considering curve A as a resonance curve of the tuned circuit with a certain applied voltage the point $P_1$ may represent the operating point of this curve under a certain set of conditions. Thus assuming an increase in line voltage which causes an increase in speed, the point $P_2$ represents the grid voltage corresponding to this increase of speed which is required by the circuit to prevent a further increase in speed. However, this increase of line voltage produces an increase of generator voltage due to the increase of current through the rectifier tube 26. At this increased generator voltage the tuned circuit would have a new resonance curve B which would give a new speed represented at $P_3$ which would give a grid voltage the same as at $P_2$, this being the grid voltage, neglecting second order effects, necessary to hold the motor to the required speed with the increased line voltage.

In order to prevent hunting action, the invention provides a repeating coil 28 having a primary winding in the plate circuit and a secondary winding in the grid circuit of the detector tube 15. The windings of the coil 28 are wound in such a direction that if the space current of the detector tube tends to fluctuate, E. M. F. is generated in the secondary winding of the coil which is proportional to the rate of change of the space current, but is independent of the absolute value of the space current. Accordingly, if the space current of the detector tube C starts to change in either direction the repeating coil 28 impresses an E. M. F. on the grid of the tube in such a direction as to oppose the change in acceleration.

The regulator system of this invention prevents changes in the speed of the motor 5 which may be due to any primary causes such as changes in load or voltage in the alternating current supply circuit connected to the motor, or temperature etc. Upon changes in the line voltage a partial correction is effected by the change in the voltage supplied by the rectifier tube 26. This partial correction is effected before any change in the motor speed has taken place.

The invention is also susceptible of other modifications and adaptations not specifically described but comprised within the scope of the appended claims.

What is claimed is:

1. The combination with a dynamo electric machine, of a regulator including a detector responsive to variations in the speed of said machine, and means for impressing upon said detector an E. M. F. proportional to the rate of change of the speed of said machine.

2. The combination with a dynamo electric machine and a supply circuit therefor, of a regulator including a detector responsive to variations in the speed of said machine, means controlled by said detector to vary the voltage across said supply circuit in response to variations in the speed of said machine, and means for impressing upon said detector an E. M. F. proportional to the rate of change of the speed of said machine.

3. The combination with a dynamo electric machine, of a regulator including a space discharge tube responsive to variations in the speed of said machine, input and output circuits for said tube, and means for impressing upon said input circuit an E. M. F. proportional to the rate of change of the space current in said output circuit.

4. The combination with a dynamo electric machine, of a regulator including a space discharge tube responsive to variations in the speed of said machine, input and output circuits for said tube, and a repeating coil having a primary winding in said output circuit and a secondary winding in said input circuit to produce an E. M. F. in said input circuit proportional to the rate of change of the space current in said output circuit.

5. The combination with a dynamo electric machine and a supply circuit therefor, of a regulator including a space discharge tube responsive to variations in the speed of said machine, input and output circuits for said tube, means controlled by the current in said output circuit to vary the voltage across said supply circuit in response to variations in the speed of said machine, and means for varying the voltage across said input circuit in proportion to the rate of change of the speed of said machine.

6. The combination with a dynamo electric machine and a supply circuit therefor, of a regulator including a space discharge tube responsive to variations in the speed of said machine, input and output circuits for said tube, means controlled by the current in said output circuit to vary the voltage across said supply circuit in response to variations in the speed of said machine, and means for impressing upon said input circuit an E. M. F. proportional to the rate of change of the space current in said output circuit to prevent hunting action.

7. The combination with a dynamo electric machine and a supply circuit therefor, of a regulator including a detector responsive to variations in the speed of said machine, a pair of three-element space discharge tube amplifiers coupled to said detector and having filaments and control electrodes at substantially the same potential when said machine is operating below the desired speed to produce a large space current therein, and means responsive to variations in the space current of said amplifier tubes to vary the voltage across said supply circuit.

8. The combination with a dynamo electric machine and an alternating current supply circuit therefor, of a regulator including a three-element space discharge tube detector responsive to variations in the speed of said machine, a pair of three-element space discharge tube amplifiers coupled to said detector tube and arranged to vary the voltage across said supply circuit in response to variations in the space current of said detector tube, and means associated with said supply circuit to supply energy to said detector and amplifier tubes.

9. In a speed regulator system, an alternating current motor, means comprising a space discharge device for controlling said motor to maintain the speed thereof substantially constant, and means acting on said space discharge device for stabilizing the regulating action to prevent hunting.

10. The combination with an alternating current dynamo electric machine, of a detector responsive to variations in the speed of said machine, means controlled by said detector to regulate the speed of said machine, and means controlled by said detector to prevent hunting.

11. The combination with an alternating current dynamo electric machine and a supply circuit therefor, of a variable impedance associated with said supply circuit, a space discharge tube detector responsive to variations in the speed of said machine, input and output circuits for said detector, means controlled by the space current in said output circuit to vary the value of said impedance in response to variations in the speed of said machine, and a repeating coil having a primary winding in said input circuit and a secondary winding in said input circuit to impress upon said input circuit an E. M. F. proportional to the rate of change of the space current in said output circuit to prevent hunting.

12. In a regulator system, an alternating current dynamo electric machine, means comprising a space discharge device for maintaining an operating characteristic of said machine substantially constant, and means acting on said space discharge device to prevent hunting action.

13. In a regulator system, an alternating current dynamo electric machine, a source of alternating current having a frequency varying in accordance with an operating characteristic of said machine, a tuned circuit connected to said source, means for maintaining said operating characteristic of the machine substantially constant and comprising a space discharge device connected to said tuned circuit, and a connection from the output circuit of the tube to the input thereof to stabilize the regulation and prevent hunting.

14. The combination with an alternating current dynamo electric machine, of a regulator including a detector responsive to variations in a characteristic of said machine, and means for impressing on said detector an electromotive force varying with the rate of change of said characteristic.

15. The combination with an alternating current dynamo electric machine, of a regulator including a three-element space discharge tube responsive to variations in a characteristic of said machine, input and output circuits for said tube, and means for impressing on said input circuit an electromotive force varying with the rate of change of the space current in said output circuit.

16. A regulator for an alternating current circuit, comprising a space discharge tube responsive to variations in a characteristic of said circuit, input and output circuits for said tube, means controlled by said tube for maintaining said characteristic substantially constant, and means for impressing on said input circuit an electromotive force varying with the rate of change of the current in said output circuit to prevent hunting action.

17. In a regulator system for a motor, a supply circuit connected to said motor, a coupling means, means for impressing a potential on said coupling means which varies according to the speed of said motor, a substantially constant counter electro-motive force connected to said coupling means, amplifying means operating independently of moving parts connected to said coupling means, and means connected to said amplifying means for controlling said supply circuit to maintain the motor speed substantially constant.

18. In a regulator system, an alternating current motor, an alternating current supply circuit connected to said motor, two space discharge tubes serving as an amplifier and having input and output circuits, means for energizing said input circuits according to the speed of said motor, means for so connecting said output circuits to the supply circuit as to effect full wave rectification, and means controlled by the output circuits for governing said supply circuit to maintain the motor speed substantially constant.

In witness whereof, we hereunto subscribe our names this 3rd day of August A. D., 1926.

HUGH M. STOLLER.
EDMUND R. MORTON.